Sept. 20, 1966  G. D. HENNINGER  3,274,409
REED DRIVING MECHANISM
Filed June 7, 1963

Inventor
George D. Henninger.
By Zabel Baker York Jones + Dithmar
Attorneys.

United States Patent Office 3,274,409
Patented Sept. 20, 1966

3,274,409
REED DRIVING MECHANISM
George D. Henninger, Chicago, Ill., assignor to Amglo Corporation, Chicago, Ill., a corporation of Illinois
Filed June 7, 1963, Ser. No. 286,262
1 Claim. (Cl. 310—46)

This invention relates to reed driving mechanism for a reed controlled, constant speed, direct current motor of the general type shown in Henninger et al. U.S. Patent No. 2,753,471. The present reed driving mechanism is an improvement over the comparable mechanism shown in said patent.

The direct current motors shown in aforesaid Patent No. 2,753,471 and earlier Henninger et al. U.S. Patent No. 2,282,582 have found wide use in industrial, military and space fields, particularly where exceptional accuracy is required, as for example in timers. The speed of the motor is under the control of a vibrating reed that has an extremely constant frequency of vibration. The reed is energized or driven at its characteristic frequency by means of magnetic relation with a rotatable reed driving member mounted on the motor shaft.

The vibrating reed actuates switch means that make and break one or more direct current circuits which, in turn, generate the electromagnetic field that drives an armature mounted on the motor shaft.

Uses for motors of this type recently have increased, and in many instances the space available for such motors imposes severe limitations on motor size.

Further, some of the uses impose critical requirements on self-starting ability, particularly when the motor is under load.

One object of the invention, therefore, is to provide a reed driving mechanism that is considerably smaller in size and lighter in weight than prior reed driving mechanisms, such as the mechanisms shown in prior Patent No. 2,753,471. Attainment of this object enables the motor to have smaller over-all size, and makes the motor available for many new uses.

Another object is to provide reed driving mechanism that, despite its small size, possesses sufficiently high field strength to drive the reed effectively and to stop the motor under normal load in a rest position that will insure self-starting in desired direction when the motor next is energized.

Another object is to provide reed driving mechanism that employs Alnico V permanent magnets. Alnico V has considerably higher magnetic strength than the predecessor Alnico IV magnets used in the reed driving mechanism shown in FIGS. 1 and 2 of Patent No. 2,753,471. Speaking generally, the present reed driving member has about one-half the diameter of the reed driving member shown in the prior patent, and more than twice as much magnetic strength for driving the reed and stopping the motor at desired rest position.

Figures 1, 2:
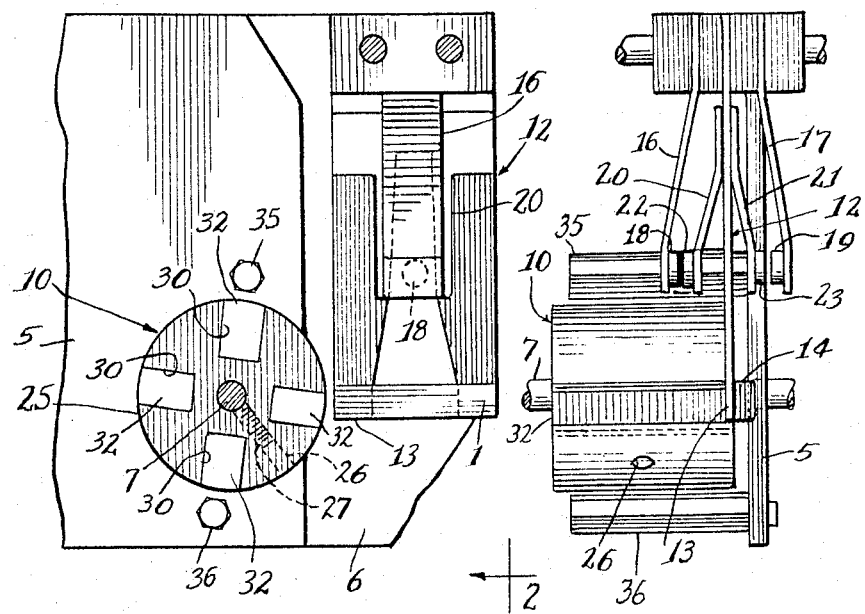

In view of the differences in the manufacture of the Alnico IV and Alnico V magnets, the latter may not be used in a reed driving member of the type shown at 60 in FIGS. 1 and 2 of the said prior patent. The member 60 of Alnico IV material first was formed to desired shape, and thereafter the poles were magnetized with alternate polarity. In Alnico V, the metal is magnetized while in a super-heated state during manufacture, thereby rendering Alnico V unsuitable for use in a subsequently magnetized reed driving member such as shown in the prior patent.

Other objects, advantages and details of the invention will be apparent as the description proceeds, reference being had to the accompanying drawing wherein two forms of the invention are shown. It is to be understood, however, that the description and drawing are illustrative only, and that the scope of the invention is to be measured by the appended claim.

Figure 3:
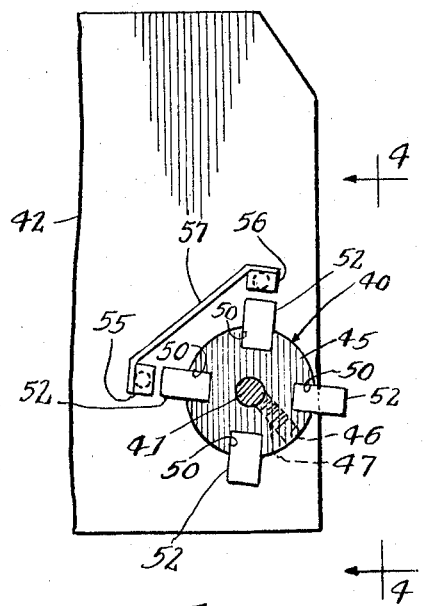
Figure 4:
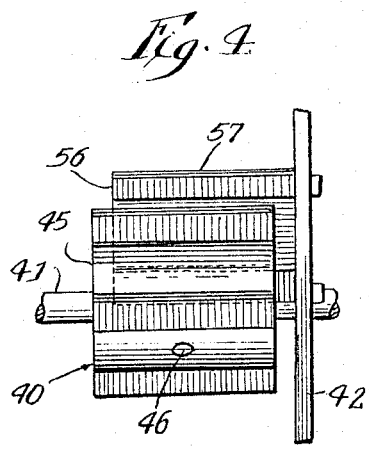

In the drawing:
FIG. 1 is a fragmentary front elevational view of a reed controlled direct current motor illustrating the reed driving mechanism of the invention.
FIG. 2 is a fragmentary side elevational view of the mechanism shown in FIG. 1, the view taken on line 2—2 of FIG. 1.
FIG. 3 is a front elevational view of modified reed driving mechanism embodying the invention.
FIG. 4 is a fragmentary side elevational view of the mechanism shown in FIG. 3, the view taken on line 4—4 of FIG. 3.

Reference again is made to U.S. Patent No. 2,753,471 for a general understanding of the structure and operation of the reed controlled direct current motor in which the present invention is used. As mentioned, the purpose of the reed driving mechanism is to energize or drive the vibrating reed and to insure that the motor comes to rest under normal load at proper rotary position to insure self-starting. The present reed driving mechanism may be made smaller in size and greater in driving strength than the mechanism of the prior patent.

Referring to FIGS. 1 and 2, the illustrated fragmentary part of the motor includes front frame plate 5 and rear frame plate 6 (shown in FIG. 1 only). A motor shaft 7 is journalled at its rear in front frame plate 5.

A reed driving member 10 is mounted rigidly on motor shaft 7 in proper angular relation with the motor rotor (not shown) to insure self-starting of the motor when the member is in rest position, as will be described.

A bifurcated reed 12 is mounted on rear frame plate 6, the free end 13 of the reed disposed adjacent reed driving member 10. A bar magnet 14 is carried on free end 13 of the reed. Alternatively, a bar of unmagnetized magnetic material may be carried by the reed.

As in the case of the motor shown in the said prior patent, reed 12 is mounted between a pair of spaced arms 16 and 17 (FIG. 2), the respective arms carrying at their ends switch contacts 18 and 19. These contacts are relatively fixed, except that arms 16 and 17 possess inherent resilience.

Reed 12 carries a pair of arms 20 and 21 (FIG. 2), one on each side of the reed. These latter arms have switch contacts 22 and 23 in effective relation with fixed contacts 18 and 19.

When reed 12 vibrates at its characteristic frequency, for example 100 cycles per second, switch contacts 18 and 22 make and break periodically, and switch contacts 19 and 23 make and break at the same frequency in alternation with contacts 18 and 22, all as described more fully in the prior patent.

Reed driving member 10, the subject of this invention, comprises a magnet-holding means 25 of nonmagnetic material. As shown in FIGS. 1 and 2 magnetholding means 25 is a small-diameter cylinder of suitable material such as aluminum having an axial opening to receive motor shaft 7. A threaded radial opening 26 is provided to accommodate a set screw 27 for securing means 25 to shaft 7.

Magnet-holding means 25 has a plurality of recesses 30 that are parallel to each other and to the axis of means 25. As illustrated, four such recesses are provided, and they are spaced angularly at 90 degree intervals, extending from end to end of means 25.

A bar magnet 32, preferably Alnico V, is mounted in each recess 30. Magnets 32, which as illustrated have a length generally equal to the diameter of means 25, may be secured in place by a press fit, or may be held within the recesses by suitable adhesive. The magnets usually are oriented similarly as to polarity, that is, all north poles, for example, are at the end of holding means 25 near reed magnet 14. In such case the adjacent end of reed magnet 14 would be the south pole so reed magnet 14 is attracted by the respective magnets 32.

Still referring to FIGS. 1 and 2, upper and lower bars 35 and 36 of magnetic material are mounted on frame plate 5, the bars extending substantially the length of reed driving member 10 and slightly spaced from the peripheral surface thereof. Bars 35 and 36 have generally the same angular separation as that of the magnets 32 that are adjacent bars 35 and 36 when reed driving member 10 is at rest. In the form of the invention shown in FIG. 1, the angular separation is about 180 degrees.

Bars 35 and 36 are effective to insure that reed driving member 10 comes to rest with magnets 32 thereof adjacent the respective bars, as shown in FIG. 1. In this rest position a magnet 32 is adjacent magnet 14 at the end of reed 12, thereby attracting (or repelling) magnet 14 and reed 12 so that one pair of switch contacts is closed.

In FIGS. 1 and 2, the magnets are polarized such that reed magnet 14 is attracted to magnet 32 and reed 12 is stressed, thereby causing switch contacts 18 and 22 to be closed. The field and rotor portions of the motor are so designed that when these two contacts are closed, and the motor energized, the motor will self-start in desired direction.

As reed driving member 10 rotates, the magnet 32 adjacent reed magnet 14 moves away from the latter, thereby permitting reed 12 to travel in direction away from member 10. The following magnet 32 next approaches reed magnet 14 and attracts same, thereby reversing the direction of reed travel. In this manner reed 12 is driven at its characteristic frequency, as will be understood.

Referring to FIGS. 3 and 4, a modified reed driving member 40 is mounted on a shaft 41 journalled at one end to plate 42.

Reed driving member 40 comprises a magnet holding means 45 that is considerably smaller in diameter, relatively, than means 25 shown in FIG. 1. Means 45 similarly is provided with a threaded radial opening 46 that receives a set screw 47 for securing means 45 to shaft 41.

Magnet holding means 45 also has recesses 50 that are comparatively shallow in depth, but parallel to each other and to the axis of member 45. As shown, recesses 50 are four in number and spaced uniformly about the axis of member 45.

A bar magnet 52 is seated and secured within each recess 50, the outer face of each magnet extending radially beyond the surface of means 45. A suitable adhesive such as an epoxy compound is used to secure magnets 52 in the respective recesses. The function of reed driving member 40 is the same as that of member 10 shown in FIGS. 1 and 2. The main difference between the two is that member 40 may be made smaller in size and lighter in weight, thereby permitting even smaller overall motor size and weight.

The form of the invention shown in FIGS. 3 and 4 also employs a modified arrangement of the bars of magnetic material used to establish desired rest position of reed driving member 40. As shown, bars 55 and 56 are secured to a plate 57 of magnetic material, and the assembly of magnets 55, 56 and plate 57 is secured to mounting plate 42. Magnets 55 and 56 are spaced angularly by about 90 degrees, approximately the same spacing provided between adjacent magnets 52 of reed driving member 40. Plate 57 increases the effective strength of the magnetic relation between bars 55, 56 and magnets 52, thereby insuring with a greater factor of safety that member 40 will come to rest in proper position for self-starting.

Reed driving member 40 of FIGS. 3 and 4 has the same relation to a cooperating reed as shown in FIGS. 1 and 2, the reed and associated switches being omitted in FIGS. 3 and 4 to avoid duplication.

From the above description it is believed that the construction and advantages of the invention will be readily apparent to those skilled in the art. Various changes may be made without departing from the spirit or losing the advantages of the invention.

Having thus described the invention, what I claim as new and desire to secure by Letters Patent is:

Reed driving mechanism for a direct current constant speed motor having a switch-actuating vibrating reed with a bar of magnetic material at its free end, said mechanism comprising:

magnet holding means of nonmagnetic material adapted to be mounted rigidly on the motor shaft adjacent the free end of said reed;

a plurality of bar magnets secured to said magnet holding means in uniformly spaced relation circumferentially, an end of each bar magnet located to travel adjacent the bar of magnetic material at the free end of said reed and thereby drive the reed at its characteristic frequency of vibration;

a magnetic means in effective relation with the travel path of said bar magnets for causing said magnet holding means to come to rest with a magnet in proximity to the bar of magnetic material on said reed, said magnetic means including a plurality of bars of magnetic material parallel to, and spaced radially outwardly from the travel path of, said bar magnets, the angular separation of said bars being substantially the same as that of the bar magnets that are adjacent said bars when said magnet holding means comes to rest; and a plate of magnetic material connecting said bars of magnetic material.

References Cited by the Examiner

UNITED STATES PATENTS

| | | | |
|---|---|---|---|
| 2,266,037 | 12/1941 | Henninger | 310—46 |
| 2,473,839 | 6/1949 | Altfather | 310—46 |
| 2,492,435 | 12/1949 | Ortline | 310—46 |
| 2,538,216 | 1/1951 | Stehlik | 310—46 |
| 2,753,471 | 7/1956 | Henninger | 310—46 |
| 2,994,023 | 7/1961 | Devol | 310—156 |

MAX L. LEVY, *Primary Examiner.*

ORIS L. RADER, *Examiner.*

MILTON O. HIRSHFIELD, J. W. GIBBS,
*Assistant Examiners.*